A. A. KENT.
VEHICLE SPRING.
APPLICATION FILED MAR. 23, 1917.

1,288,915. Patented Dec. 24, 1918.

INVENTOR
Arthur Atwater Kent.

WITNESSES

BY
ATTORNEY

UNITED STATES PATENT OFFICE.

ARTHUR ATWATER KENT, OF ROSEMONT, PENNSYLVANIA.

VEHICLE-SPRING.

1,288,915.

Specification of Letters Patent.  Patented Dec. 24, 1918.

Application filed March 23, 1917. Serial No. 157,018.

*To all whom it may concern:*

Be it known that I, ARTHUR ATWATER KENT, a citizen of the United States, and a resident of Rosemont, in Montgomery county and State of Pennsylvania, have invented certain new and useful Improvements in Vehicle-Springs, of which the following is a specification.

This invention relates to vehicle springs and more particularly to those for automobiles or similar vehicles whereby the chassis or body of the vehicle is yieldingly supported upon the axles or running gear.

The objects of this invention are to provide a spring for the purposes above indicated in which each leaf or member of a composite spring structure is so supported and connected with the vehicle body that each leaf exerts its tension or resiliency undiminished by the action of the other leaves or members.

A further object of my invention is to provide a spring construction in which during the flexing thereof, all friction due to rubbing or sliding of one leaf longitudinally of the others is eliminated; to provide a more resilient spring construction; to equalize the amount of weight borne by the various members or leaves of the spring, and to provide a construction in which all noise, squeaking and creaking are obviated, as the spring flexes under various pressures due to whatever causes as the unevenness of the road and other differences in the load imposed upon the springs.

Other objects of my invention will appear in the specification and claims below.

Figure 1:
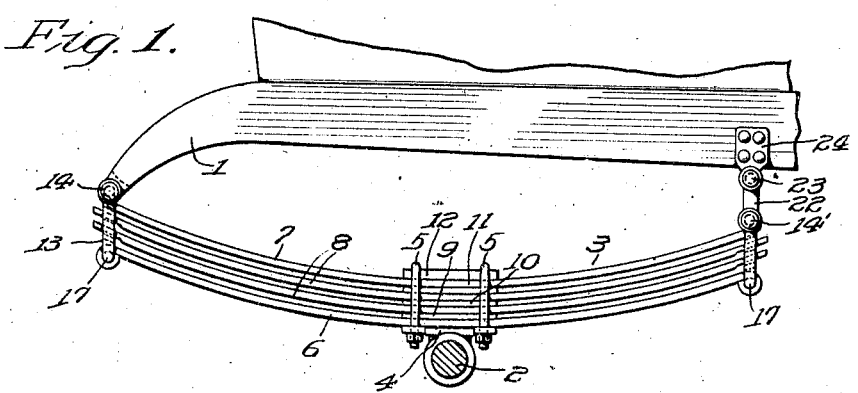
Figure 2:
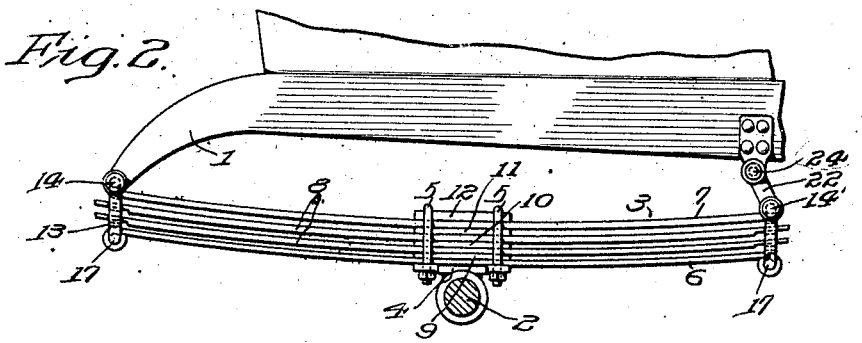
Figure 4:
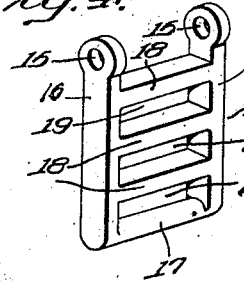
Figure 3:
Figure 5:
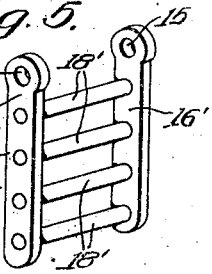

Referring to the accompanying drawings forming a part of the specifications, and in which similar reference characters are employed throughout the various views to designate the same parts, Figure 1 is a side elevational view of a portion of the frame of a vehicle with my improved spring attached thereto, parts of the spring structure being shown in side elevation; Fig. 2 is a similar view showing the position of the spring and the parts thereof under the action of a greater load than that indicated in Fig. 1; Fig. 3 is a side view partly in section of the detail of construction, the same being shown on an enlarged scale as compared with the scale of Figs. 1 and 2; Fig. 4 is a perspective view of one of the hangers attached to the ends of the spring and serving to hold the ends of the leaves of the spring in spaced relationship with each other, and Fig. 5 is a perspective view of a modified construction of hanger.

The frame or side bar 1 of the vehicle may be of any improved construction and it is supported from the axle 2 through the improved spring 3, the subject matter of this application. The axle 2 is rigidly mounted in a bracket or bolster 4 and to the top of this bracket is secured a composite spring 3, by means of U-shaped straps 5 passing through suitable apertures in the bracket 4 and inclosing or surrounding the spring between, and preferably midway, the ends of the spring.

The spring 3 consists of a lower leaf 6 and upper leaf 7 and intermediate leaves 8—8, all of substantially the same length and extending parallel to each other. The central portion of the lower leaf preferably rests upon the top of the bracket 4. Next above it and supported upon the top side of the leaf 6 is a thin spacing bar 9. Resting upon this spacing bar 9 is the lower of the intermediate springs 8. Above this is a second spacing bar 10. Above this spacing bar is the upper of the intermediate leaves 8; above the latter leaf is a third spacing bar 11 and resting upon this spacing bar 11 is the upper leaf 7. The spacing bars 9, 10 and 11 are slightly longer than the distance between the U-shaped straps 5—5 so that the straps pass around the leaves of the spring and over the ends of the spacing bars. Preferably a fourth bar 12, similar to the spacing bars 9, 10 and 11, is placed above the upper leaf 7 similarly extending under the straps 5—5 to provide throughout an inflexible structure immediately above the axle 3.

From the end of the frame 1 depends a hanger 13 (shown on an enlarged scale in Fig. 4), said hanger being pivotedly mounted on a bolt or pivot pin 14 of the hanger 13 passing through the end of the frame 1 and fitted in alined openings 15 in the hanger 13. This hanger consists of the bolt or pin 14, two depending parallel sides 16—16 and a cross bar 17, preferably circular in cross section, at its lower side. Between the pivot pin or bolt 14 and the cross bar 17 are a plurality of parallel intermediate cross bars 18—18—18, said intermediate bars being preferably square or rhomboidal, or circular, in cross section and providing apertures 19—20— and 21 therethrough (see Figs. 3 and 5).

The upper leaf 7 preferably passes under the pivot pin 14 above the upper cross bar 18 and is bent around the said pivot pin 14. The free end of the upper of the intermediate leaves 8 passes through the opening 19 in the hanger and bears against the under side of the cross bar 18 immediately above it. The free end of the lower of the intermediate leaves 8 passes through the aperture 20 in the hanger 13 and similarly bears against the under side of the cross bar immediately above it while the lower leaf 6 has its free end passing through the aperture 21 and said end is preferably bent or wrapped around the lower cross bar 17. The opposite ends of the spring 2 are similarly mounted in a similar hanger, but the pivot pin 14' is mounted in a link 22, the upper end of which is supported on a pivot pin 23 carried by a bracket 24 rigidly secured to the said bar or frame 1 of the vehicle.

Preferably the free ends of the intermediate leaves 8—8 are reduced somewhat in thickness in order that they may pass freely through their respective openings 19 and 20 in the hangers 13, and in order that the intermediate cross bars 18 may be as heavy as may be required without making the hangers unduly or unnecessarily long.

The modified form of hanger shown in Fig. 5 consists of two vertical side plates 16'—16' connected together by pins or bolts 18' having their ends riveted to the side bars 16'. The tops of the side bars 16' are provided with alined openings 15 to receive the pivot 14' from which the hanger depends from the frame 1. In this case the upper sides of the intermediate leaves 8 will bear against the under sides of the two intermediate bolts 18' preferably circular in cross section; the upper leaf 7 will have its free end similarly bent around the pivot pin 14 or 14' fitting in the openings 15 in the top of the hanger 13' and the free ends of the lower leaf 6 will pass first over the lower bolt 18' and thence around it in the same manner as that described in connection with the lower cross bar 17 of the hanger 13.

With the above construction it will be seen that as the spring is flexed under varying loads the hangers and the leaves of the spring will always be parallel with each other and the load will be taken up by the ends of the leaves throughout the entire length through which they are flexed; there will be no sliding or creeping longitudinally of the leaves over each other and the consequent creaking or squeaking is entirely obviated. The link 22 permits the hanger 13, supported from the pivot 14' to move slightly laterally with respect to the hanger supported from the fixed pivot 14 as the spring is straightened or flexed and the curvature of the leaves is greater or less under varying loads, but the leaves will always be parallel to each other and the hangers will also be always parallel to each other.

The above construction is simple, easily constructed and assembled and provides for equal distribution of the load upon all of the leaves of the spring; it is, of course, obvious that more or fewer than two intermediate springs may be employed depending upon the capacity of the vehicle and the load required to be carried thereby, without departing from the spirit and scope of my invention.

Having thus described my invention what I claim and desire to protect by Letters Patent of the United States is:

1. The combination with the frame of a vehicle and an axle therefor, of a spring rigidly secured between its ends to said axle and comprising a plurality of parallel leaves of substantially the same length, and out of contact with each other throughout their length, a hanger pivoted at one end to said frame, and pivotally connected to the adjacent ends of the upper and lower leaves of said spring, a link pivoted at one end to said frame, and a second hanger, similar to the first above mentioned hanger, and similarly pivotally connected to the other ends of said leaves, and pivoted to the free end of said link.

2. The combination with the frame of a vehicle and an axle therefor, of a spring rigidly secured between its ends to said axle and comprising an upper and a lower leaf, parallel to and spaced from each other throughout their length, a pair of hangers one at each end of said spring, respectively, the free adjacent ends of the upper and lower leaves being pivotally attached to one hanger, the opposite adjacent ends of the upper and lower leaves being similarly pivotally attached to the other hanger, and a link pivoted to said frame, one of said hangers being pivoted to said frame and the other of said hangers being pivotally attached to said link.

3. The combination with the frame of a vehicle and an axle therefor, of a spring comprising an upper, a lower and an intermediate leaf, parallel to and spaced from each other throughout their length, a pair of hangers, one at each end of said spring, respectively, the free adjacent ends of the upper and lower leaves being pivotally attached to one hanger, the opposite adjacent ends of the upper and lower leaves being similarly pivotally attached to the other hanger, and a link pivoted to said frame, one of said hangers being pivoted to said frame, and the other of said hangers being pivotally attached to said link, each hanger being provided with a cross bar against which the free end of said intermediate leaf continually presses in supporting relation with respect to the load of said spring.

4. The combination with the frame of a vehicle and an axle therefor, of a spring comprising a plurality of parallel resilient leaves, spacing means intermediate the ends of said leaves, means to clamp said leaves and spacing means rigidly to said axle, a pair of hangers, one at each end of said spring, respectively, and against which the free ends of said leaves continually press in supporting relation with respect to the load on said spring, and a link pivoted to said frame, one of said hangers being pivoted to said frame and the other of said hangers being pivoted to said link.

5. The combination with the frame of a vehicle and an axle therefor, of a spring comprising a plurality of parallel leaves, means to hold said leaves out of engagement with each other throughout their length, comprising a spacer between adjacent leaves and between the ends of the spring and means to rigidly secure said leaves and spacer to said axle, and a pair of hangers, one at each end, respectively, of said spring and to which the outer leaves are pivotally connected at separate points in continual supporting relation to the load on said spring.

6. The combination with the frame of a vehicle and an axle therefor, of a spring comprising a plurality of leaves, all of which leaves are parallel to each other, means to hold said leaves out of engagement with each other throughout their length, comprising a spacer between adjacent leaves and between the ends of the spring and means to rigidly secure said leaves and spacers to said axle, and a pair of hangers, one at each end, respectively, of said spring and to which the outer leaves are pivotally connected at separate points in supporting relation to the load on said spring, each intermediate leaf being also in continual load supporting engagement with said hangers.

7. The combination with the frame of a vehicle and an axle therefor, of a spring comprising a plurality of spaced leaves all of which are out of contact with each other and parallel to each other throughout their length, and a pair of hangers, one at each end, respectively, of said spring and each provided with parallel cross bars rigid therewith, the free ends of the outer leaves each encircling a cross bar of the hanger adjacent thereto.

8. The combination with the frame of a vehicle and an axle therefor, of a spring comprising a plurality of spaced leaves all of which are parallel to each other and out of contact with each other throughout their length, and a pair of hangers, one at each end, respectively, of said spring and each provided with parallel cross bars rigid therewith, the free ends of the outer leaves each encircling a cross bar of the hanger adjacent thereto and any and all intermediate leaves engaging at the ends thereof a cross bar in load supporting relation.

In witness whereof I have hereunto set my hand this 17th day of March, 1917.

ARTHUR ATWATER KENT.